July 6, 1926.
L. F. ROUSSEAU
1,591,144
ELASTIC SUSPENSION FOR AUTOMOBILES
Filed June 8, 1923
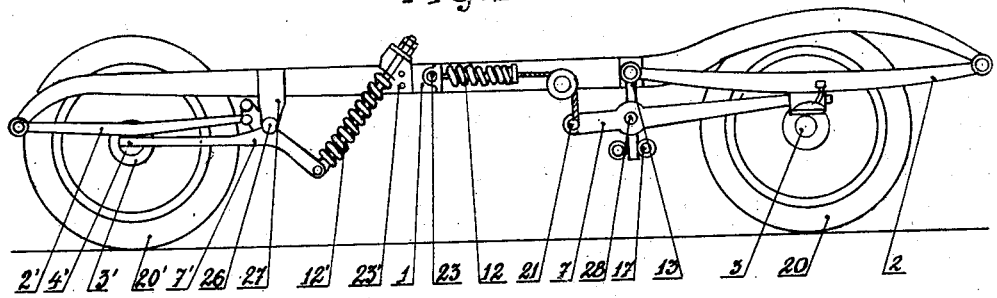
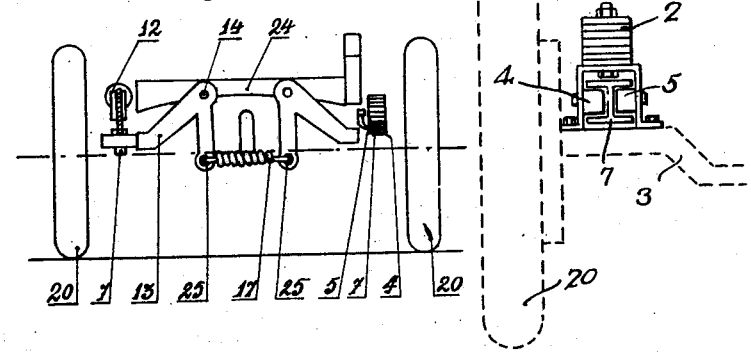
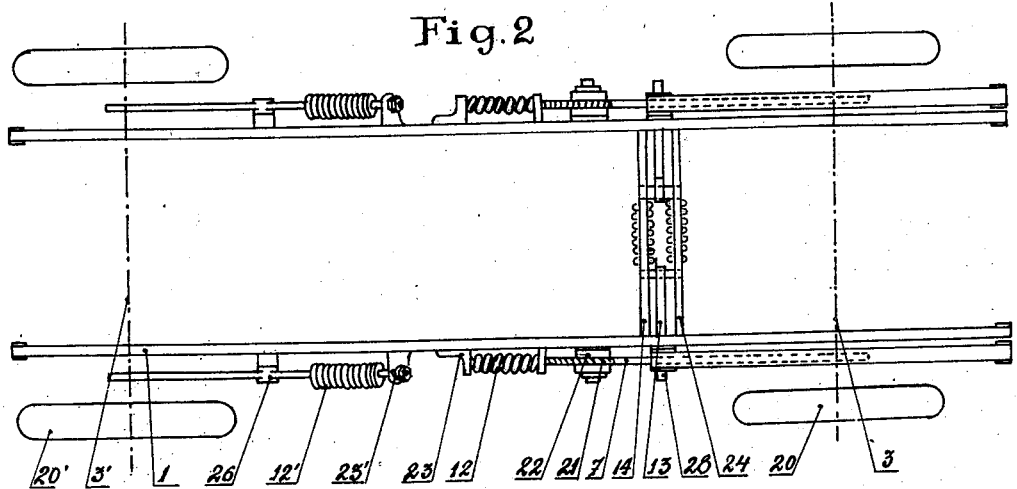
Inventor
L. F. Rousseau,
By Marks Clerk
Attys.

Patented July 6, 1926.

UNITED STATES PATENT OFFICE.

LOUIS FRÉDÉRIC ROUSSEAU, OF PARIS, FRANCE.

ELASTIC SUSPENSION FOR AUTOMOBILES.

Application filed June 8, 1923, Serial No. 644,268, and in France June 30, 1922.

My invention relates to an improved elastic suspension which is chiefly applicable to automobiles, but may also be employed upon other vehicles.

The said suspension has particularly for its object to eliminate the rolling motion of vehicles i.e. the oscillation upon the longitudinal axis of the vehicle frame, as well as the jolting which occurs when travelling over an elevated part or depression in the road.

The arrangement comprises either the known plate springs, or tie rods, in addition to two like groups of symmetrically disposed longitudinal and transverse levers with suitably proportioned arms, which are directly or indirectly connected together and are connected at one end with the rear axle of the vehicle and at the other by coiled springs having the proper tension with the longitudinals and the cross-pieces supporting the vehicle body.

The said device has a relatively simple construction, and it ensures a very responsive action in vehicles upon which it is employed, without prejudice to the substantial construction of the whole arrangement.

The appended drawings which are given by way of example set forth the said invention:

Fig. 1 is an elevational view of the frame of an automobile provided with the said suspension.

Fig. 2 is a plan view of the same.

Fig. 3 is an end view of the rear axle portion.

Fig. 4 is an elevational detail on the enlarged scale of part of the arrangement shown in Fig. 3.

In the following description, only one side of the vehicle will be described, it being understood that the other side is identical, the various elements being in symmetrical disposition with respect to the longitudinal axis of the vehicle, as observed in Fig. 2.

The side-pieces of the vehicle frame 1 are held by means of plate springs 2, 2′ as in the known types, said springs being mounted on the axles 3, 3′ supported by the wheels 20, 20′. At each end of the rear axle 3 is a bracket or holder provided with spaced horizontal tenons 4, 5. A lever 7 is arranged on each side of the vehicle frame, the rear part of each lever being I-shaped in cross section and slidably supported in the corresponding bracket. The said lever is also secured at the front part to a flexible element such as a chain 21, and the said chain which passes over a roller 22 centered on an axle secured to the frame, is attached to a coiled spring 12 which is mounted on an angle piece 23 bolted to the corresponding longitudinal of the vehicle 1.

Each lever 7 is pivoted at 28 to the outer arm of a transversely disposed bell-crank lever 13. The pivoting point 28 is located in such manner that the lever 7 shall be divided into two parts which are suitably proportioned to the tension of the various springs forming the suspension. The lever 13 is adapted to pivot on an axle 14 which bears upon the cross-pieces 24 which are mounted so as to cross-brace the vehicle frame.

The inner arm of the bell crank lever 13 is disposed in a substantially vertical direction and has its terminal connected to a horizontal bar 25 disposed parallel with the axis of the vehicle and having secured thereto the ends of two coiled springs 17 which are mounted as in the corresponding arrangement on the other side of the vehicle as set forth.

In the suspension of the front wheels 20′ the transverse bell crank levers are eliminated. The longitudinally disposed levers 7′ are secured to the axle 3′ by the brackets or holders 4′ as for the rear axle, but the other ends of said levers are not (as before) situated in line with the latter, but extend downwardly and are directly attached to springs 12′ which are suitably inclined to the horizontal and are secured to the vehicle frame by angle pieces 23′. The pivoting point of each lever consists of an axle 26 mounted in a bearing which is rigidly secured by a cheek 27 to the corresponding side-piece of the vehicle frame.

The operation of the said suspension device is as follows:

If one of the front wheels 20′ travels over a raised place in the road, the axle 3′ rises and compresses the plate spring 2′ situated above the same; the corresponding end of the lever 7′ follows this movement and the said lever will pivot upon 26, drawing upon the spring 12′. Should a rear wheel 20 pass over an obstacle, a like action will take place, and upon the side in question, the axle 3 will rise as well as the corresponding end of the lever 7; this latter will pivot at its other end which is not displaced, since the spring 12 which is made very strong will hold it in position. The result will be an upward motion of the pivoting point 28 which depends on the amount of deflection of the plate spring, the ratio of the lever arms and the strength of the springs 17. As the springs become stretched, a moment will arrive at which they can be no further elongated, and at this time the said point 28 becomes a stationary point, and the lever 7 continues to pivot upon this point while drawing with it the chain 21, and the latter causes the spring 12 to act since it exerts traction upon the same.

Should the vehicle travel over the depression in the road, the corresponding axle will descend, drawing upon the plate springs as in the known suspension, but in the present case the vehicle frame is still maintained. In this event the above-described movements take place in the contrary order.

For the rear axle, the lever 7 now pivots upon 28; the springs 12 draw upon the chain 21 until the springs 17 (which have now the stronger action) intervene in turn to hold the vehicle frame. It is observed that in all cases the jolting of the vehicle is rapidly reduced and particularly at the rear end the rolling motion is rapidly counteracted, i. e. the oscillation upon the longitudinal axis of the vehicle.

Obviously, the arrangements set forth are susceptible of modifications in detail without departing from the spirit of the invention. For example instead of connecting the side levers 7 with the springs 12 by chains 21, said levers may comprise bent arms directly connected with corresponding springs which are in this case suitably inclined to the horizontal as herein set forth for the front axle part.

In a modification, instead of connecting together the transverse levers by means of springs they may be connected in the same manner to a cross-piece of the vehicle frame.

I claim:
1. A vehicle suspension including the combination with a frame composed of spaced side bars, axles, of brackets mounted on the axles provided with spaced tenons, springs mounted on the brackets and having the outer ends connected to the ends of the side bars of the frame, an arrangement of levers pivotally suspended from the side bars slidably connected between the tenons and pivotally connected with the inner ends of the spring, resilient means operatively arranged between that portion of the lever arrangement which acts on the bracket and the adjacent side bar of the vehicle frame.

2. A vehicle suspension as claimed in claim 1, wherein the lever arrangement consists of a pair of longitudinally disposed levers having the rear portions I-shaped formed in cross section slidably arranged between the tenons of the bracket, a pair of transversely suspended bell crank levers the outer portions of the bell crank levers serving as pivots for the longitudinally disposed levers, resilient connections between the other portions of the bell crank levers, and resilient connections between the opposite ends of the first mentioned levers and the side bars of the frame.

3. A resilient suspension comprising in combination a vehicle frame, axles, springs connected with the axles, of longitudinal levers positioned symmetrically with the main axis of the vehicle, means for slidably connecting one of the ends of the said levers with the adjacent axle, spring connections between the other axle and the vehicle frame, bell crank levers arranged transversely beneath the vehicle frame for pivotally supporting the adjacent ends of the frame and the longitudinally disposed levers, and a resilient connection between the bell crank levers substantially as and for the purposes set forth.

In witness whereof I affix my signature.

LOUIS FRÉDERIC ROUSSEAU.